United States Patent Office 2,704,647
Patented Mar. 22, 1955

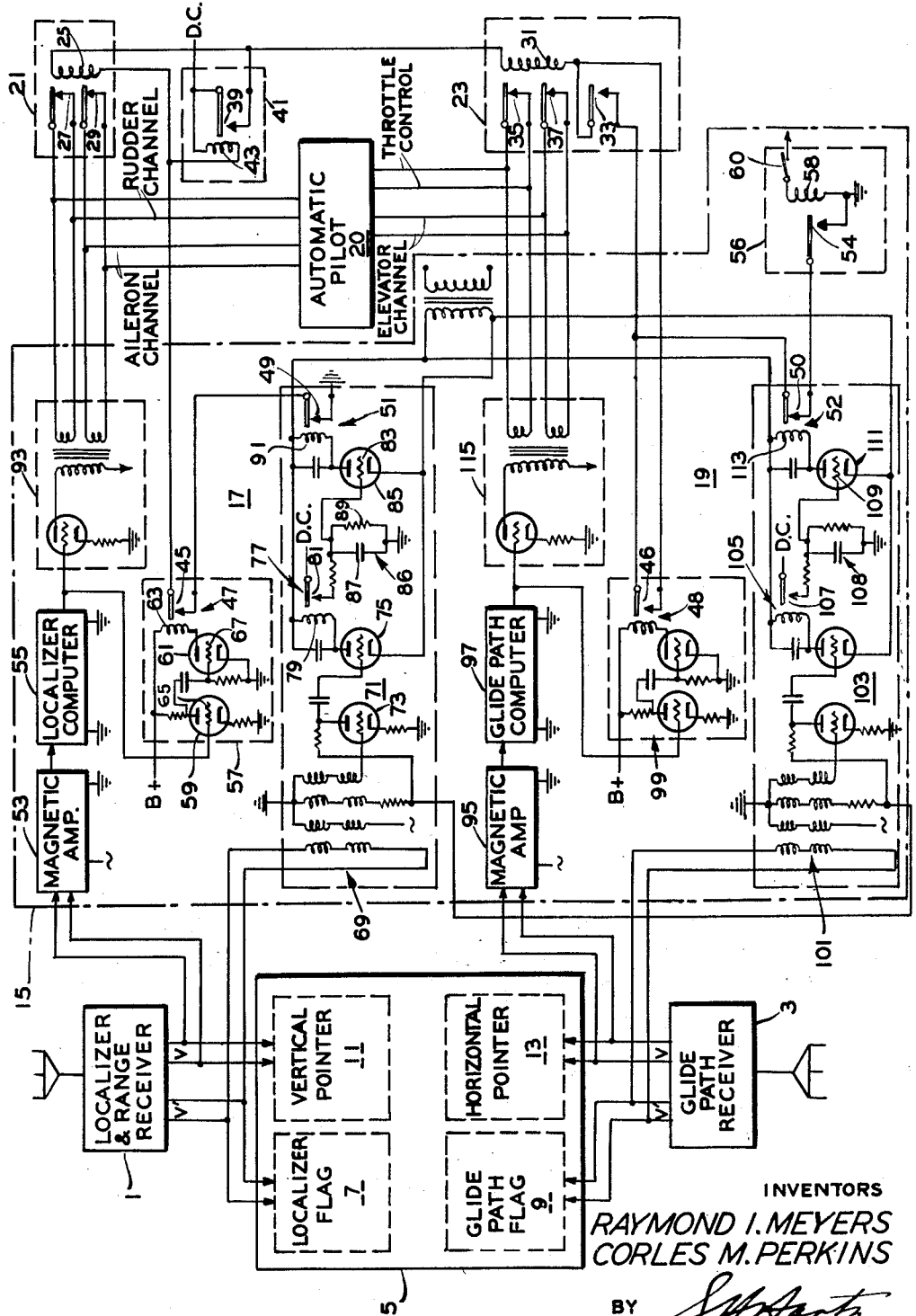

2,704,647

CONTROL FOR BEAM GUIDANCE SYSTEM

Raymond I. Meyers, Hasbrouck Heights, N. J., and Corles M. Perkins, Anoka, Minn., assignors to Bendix Aviation Corporation, Teterboro, N. J., a corporation of Delaware Application June 26, 1951, Serial No. 233,558

8 Claims. (Cl. 244—77)

The invention relates generally to flight path control apparatus for automatically guiding a craft in horizontal and vertical planes by localizer and glide path radio signals transmitted from a field on which the plane is about to land. The apparatus may be generally of the kind described and claimed in copending application Serial No. 705,524, filed October 25, 1946, by Paul A. Noxon, Alan MacCallum, and Alfred Bennett and assigned to the same assignee as the present application.

Apparatus of this general character, as used heretofore, has radio receivers for receiving the localizer and glide path signals transmitted from the field. The signals from the receivers are applied to a flight path computer and the output of the computer controls the automatic pilot on the craft. A cross-pointer indicator receives the signals from the receiver and has a vertical localizer pointer responsive to the localizer signal and a horizontal glide path pointer responsive to the glide path signal to indicate the course and altitude of the craft relative to the radio beams. The cross-pointer indicator also includes localizer and glide path flags for indicating to the pilot that localizer and glide path signals are being received by the receivers.

Before the craft is controlled by the flight path control, it is necessary for best operation of the craft that the signal from the localizer beam be of predetermined minimum strength and that the output of the localizer channel of the computer be below a predetermined maximum. Before the glide path control channel of the computer is connected to the automatic pilot, the signal from the glide path beam must be a predetermined minimum and the output of the glide path channel must be substantially zero.

Heretofore, to control the craft by the flight path control, the pilot noted the position of the localizer flag and when the flag indicated that a localizer signal of sufficient strength was being picked up by the localizer receiver, then the pilot manually connected the output of the localizer channel of the computer to the automatic pilot. The pilot then noted the position of the glide path flag and glide path pointer, and when the flag indicated that a glide path signal of sufficient strength was being picked up by the glide path receiver and when the glide path pointer was substantially centered, then the pilot manually connected the output of the glide path channel of the computer to the automatic pilot.

One object of the present invention is to prevent the localizer and glide path channels of the computer from controlling the aircraft if the radio beams are below a predetermined minimum strength without relying upon the pilot to exercise his judgement.

Another object is to prevent the localizer and glide path channels of the computer from controlling the craft if a fault occurs in the computer.

Another object is to automatically connect the glide path channel of the computer to the automatic pilot as the craft approaches the glide path beam and when the output of the computer is substantially zero.

The invention contemplates automatically controlled apparatus for aircraft having a range and localizer radio receiver and a glide path radio receiver and a computer receiving the output of the receivers. The apparatus includes means for preventing engagement of the computer and for automatically connecting the output of the glide path channel of the computer to the automatic pilot when the radio signals from the receivers are above a predetermined minimum strength and when the output of the computer is below a predetermined minimum.

When approaching a landing field, the pilot operates a control switch for connecting the flight path control equipment to the automatic pilot, but the equipment will not be connected until the above conditions are attained. Then the localizer channel of the flight path computer will be connected to the automatic pilot, and the course of the craft will be determined by the localizer beam. When the craft approaches the glide path beam, the glide path channel of the computer will be connected automatically to the automatic pilot and the glide angle of the craft will be controlled thereafter by the glide path beam. The present invention avoids human failure in turning control of the craft over to the flight path control at an inopportune time.

The foregoing and other objects and advantages of the invention will appear more fully hereinafter from a consideration of the detailed description which follows taken together with the accompanying drawings, wherein one embodiment of the invention is illustrated. It is to be expressly understood, however, that the drawings are for the purposes of illustration and description only and are not to be construed as defining the limits of the invention.

The single figure of the drawing is a wiring diagram of a flight path control constructed according to the invention.

Referring now to the drawing for a more detailed description of the novel flight path control of the present invention, the flight path control is shown as comprising a radio receiver 1 for receiving radio signals from the localizer or range transmitter and a radio receiver 3 for receiving radio signals from the glide path transmitter. Each receiver develops at its output a D. C. voltage V of one polarity when the craft is at one side of the associated radio beam and of an opposite polarity when the craft is to the other side of the associated radio beam. Also, each receiver develops at its output a D. C. voltage V' of fixed polarity corresponding to the strength of the associated radio beam.

The D. C. voltages V, V' from the radio receivers are applied to a cross-pointer indicator 5, having localizer and glide path flags 7, 9, responsive to the voltage V' of fixed polarity, and vertical and horizontal pointers 11, 13, responsive to D. C. voltages V of reversible polarity. When localizer flags 7, 9, are visible, they indicate that the strength of the associated signal is below a predetermined minimum and when the localizer flags 7, 9 are hidden from view, they indicate that the strength of the associated signal is above the predetermined minimum. Vertical and horizontal pointers 11, 13, indicate the position of the craft relative to the localizer and glide path radio beams.

The D. C. voltages V, V' from radio receivers 1, 3 are also applied to a flight path computer 15, having a localizer or range channel 17 and a glide path channel 19. The output of localizer channel 17 is applied to the rudder and aileron channels of an automatic pilot 20, and the output of glide path channel 19 is applied to the throttle control and to the elevator channel of the automatic pilot. The outputs of the localizer and glide path channels of the flight path computer are added algebraically to the signals of the associated channels of the automatic pilot so that the craft follows the localizer and glide path beams as it approaches the landing field where the transmitters are located.

When the craft is flown by the automatic pilot without radio guidance, the output of localizer channel 17 is shorted out by a relay 21 and the output of glide path channel 19 is shorted out by a relay 23. Relay 21 has an energizing coil 25 and a pair of normally closed contacts 27 and 29 connected across the output of the localizer channel 17 applied to the rudder channel of the automatic pilot and to the aileron channel of the automatic pliot, respectively.

Relay 23 has a coil 31 controlling normally open holding contacts 33 and two normally closed contacts 35 and 37 connected across the output of glide path channel 19 applied to the throttle control and to the elevator channel of the automatic pilot, respectively.

Coils 25, 31, of relays 21, 23 are connected in parallel with one another through the normally open contacts 39 of a manually operated toggle switch 41 to a direct current source. Toggle switch 41 has an energizing coil 43 for controlling manual operation of contacts 39. Coil 43 is connected in parallel with contacts 39 and with coil 25 of relay 21 to the direct current source. Contacts 39 may be closed manually only when coil 43 energized, and when the coil is not energized, contacts 39 open and remain in open position.

Coil 25 of relay 21 also is connected to ground in series with normally open contacts 45 of a relay 47 and with the normally open contacts 49 of a relay 51. Relay 47 is controlled by the output of localizer channel 17 and contacts 45 close when the output of the localizer channel is below a predetermined maximum. Relay 51 is controlled by D. C. voltage V' of fixed polarity from receiver 1 applied to localizer channel 17 and contacts 49 close when voltage V' is above a predetermined minimum sufficient to control flight of the craft along the localizer beam.

Coil 31 of relay 23 is connected to ground in series with normally open contacts 46 of a relay 48, normally open contacts 50 of a relay 52 and normally open contacts 54 of a manually controlled relay 56. Holding contacts 33 of relay 23 are connected in parallel with contacts 46 of relay 48 so that after relay coil 31 is energized, the coil remains energized even though contacts 46 open.

Relay 46 is controlled by the output of glide path channel 19 and contacts 48 close when the output of the glide path channel is below a predetermined maximum. Relay 52 is controlled by D. C. voltage V' of fixed polarity from receiver 3 applied to glide path channel 19 and contacts 50 close when voltage V' is above a predetermined minimum sufficient to control flight of the craft along the glide path beam.

Coil 58 of relay 56 is energized and closes contacts 54 when receivers 1 and 3 are tuned to the frequency of the localizer and glide path transmitters at the field to which the craft is heading. Switch 60 is normally closed and is opened when the range receiver is tuned to the frequency of a range beam. This de-energizes coil 58 of relay 56 to open contacts 54 and adapts the system to fly the craft on a range beam.

Voltage V of reversible polarity from receiver 1 is applied to a magnetic amplifier 53 in localizer channel 17, which may be of the kind described and claimed in copending application Serial No. 700,234, filed September 30, 1946, now Patent No. 2,678,919, by Alfred Bennett and assigned to the same assignee as the present application. Magnetic amplifier 53 provides an A. C. voltage modulated by D. C. voltage V.

The modulated output of magnetic amplifier 53 is applied to a localizer computer 55 and the output of the localizer computer is applied to a control circuit 57 for relay 47. Control circuit 57 has a pair of electron tubes 59, 61 and coil 63 of relay 47 is connected in the plate circuit of tube 61.

In tube 61, there is transconductance both from the cathode to the plate and from the cathode to the grid. When no alternating current voltage is applied to grid 65 of tube 59, no alternating current is applied to grid 67 of tube 61. At this time, the transconductance from cathode to plate is sufficient to energize coil 63 of relay 47 and close contacts 45. When an alternating current voltage appears on grid 65, an alternating current voltage also appears on grid 67. The transconductance of tube 61 is now from the cathode to grid 67 and when this signal exceeds a predetermined minimum, coil 63 of relay 47 is de-energized sufficiently so that contacts 45 open. Contacts 45 of relay 47, therefore, close when the output of localizer computer 55 is below a predetermined maximum and open when the output of localizer computer 55 is above a predetermined maximum. This arrangement prevents the flight path computer from controlling the craft if a malfunction exists in the computer.

Voltage V' from receiver 1 is applied to a magnetic amplifier 69 in localizer channel 17 of the kind described and claimed in the above-mentioned application. Magnetic amplifier 69 provides a modulated A. C. voltage of fixed phase corresponding in amplitude to voltage V'.

The output of magnetic amplifier 69 is amplified by a voltage amplifier 71, having an amplifier stage 73, and a discriminator stage 75. A relay 77 has a coil 79 connected in the plate circuit of stage 75 and has normally open contacts 81 connected in series with a positive bias source to a control grid 83 of an amplifier tube 85. A time delay circuit 86, having a time constant preferably of about three seconds, includes a condenser 87 and a resistor 89 in parallel with one another and connected to grid 83. Coil 91 of relay 51 is connected in the plate circuit of amplifier tube 85.

When voltage V' from localizer receiver 1 is above a predetermined minimum sufficient to control operation of the craft, coil 79 of relay 77 is energized and closes contact 81 and provides a positive bias on grid 83 of tube 85 and causes tube 85 to conduct and energize coil 91 of relay 51 to close contacts 49. If voltage V' from resistor 1 due to interference or other causes should momentarily fall below the predetermined minimum so that contacts 81 of relay 77 open, the time circuit 86 will continue to energize grid 83 of tube 85 and maintain contacts 49 of relay 51 closed until the charge on condenser 87 leaks off. When voltage V' from receiver 1 is persistently below the predetermined minimum then coil 91 of relay 51 is de-energized and contacts 49 open.

The output of localizer computer 55 is applied also to an isolation stage 93 and then to the rudder and aileron channels of the automatic pilot 20.

Voltage V of reversible polarity from receiver 3 is applied to a magnetic amplifier 95 in glide path channel 19 and the modulated A. C. output therefrom is fed to a glide path computer 97 and the output of the glide path computer is applied to a control circuit 99 for relay 48. Magnetic amplifier 95, glide path computer 97, and control circuit 99 in glide path channel 19 are substantially the same as magnetic amplifier 53, localizer computer 55, and control circuit 57 in localizer channel 17.

Contacts 46 of relay 48 close when the output of glide path computer 97 is substantially zero indicating that the craft is approaching the center of the glide path beam. Contacts 46 will not close when the output of glide path computer 97 is above a predetermined maximum due to the craft being a substantial distance above or below the glide path beam.

Voltage V' from receiver 3 is applied to a magnetic amplifier 101 in glide path channel 19 and its modulated A. C. output is amplified by voltage amplifier 103, which controls a relay 105 having normally open contacts 107 connected to a D. C. source. Contacts 107 are connected to a time delay circuit 108 and to grid 109 of an amplifier tube 111. Coil 113 of relay 52 is connected in the plate circuit of tube 111. Magnetic amplifier 101, amplifier 103, and the control circuit for relay 52 in glide path channel 19 are the same as the corresponding elements in localizer channel 17.

The output of glide path computer 97 in localizer channel 19 of the flight path computer is applied also to an isolation stage 115 and then to the throttle control and elevator channel of automatic pilot 20.

The normal procedure under flight path control is to intersect the localizer beam at some arbitrary angle and at an altitude below the glide path beam. The localizer portion of the flight path control captures the localizer beam and flies the craft toward the field and eventually intersects the glide path beam, whereupon the glide path portion of the flight path control captures the glide path beam and flies the craft to the field. The radio beams, however, are affected by local conditions, such as passing trucks, other aircraft, etc., and reception of the radio signals by receivers 1, 3 is affected by the angle of the aircraft to the beams, so that voltages V' from receivers 1, 3 may be intermittent.

Because of the unstable nature of the beams, the three second time delay circuits are incorporated in the computer to prevent disengagement of the associated relays with transient disturbances.

The flag alarms establish whether or not intelligences are present and avoids control of the craft by the flight path control on what may appear to be beam center, but may only be lack of signal.

After engagement of either localizer or glide path control, the associated flag alarms continue to monitor the radio signals to be sure that radio signals of predetermined minimum strength are being impressed on the computer.

To make a landing approach by flight path control receivers 1 and 3 are tuned to the frequency of the transmitter at the field on which the craft is to land and this automatically closes switch 60 connected mechanically to the tuning mechanism and energizes coil 58 of relay 56 to close contacts 54. Toggle switch 41 may be closed manually when contacts 45 of relay 47 and contacts 49 of relay 51 are closed; that is, when the output of localizer computer 55 is below a predetermined maximum and a radio signal of sufficient strength is being received by receiver 1.

When contacts 39 of toggle switch 41, contacts 45 of relay 47, and contacts 49 of relay 51 are all closed, then coil 25 of relay 21 is energized and contacts 27, 29 open and the output of localizer channel 17 is applied to the rudder and aileron channels of automatic pilot 20 to fly the craft on the localizer beam.

Contacts 46 of relay 48 close when the craft is flying substantially along the glide path beam and contacts 50 of relay 52 close when the radio signal received by receiver 3 is of sufficient strength to control the craft. When contacts 46 of relay 48 and contacts 50 of relay 52 are closed, then coil 31 of relay 23 is energized and holding contacts 33 close and contacts 35, 37 open and the output of glide path channel 19 is applied to the throttle control and elevator channel of automatic pilot 20 to fly the craft on the glide path beam as it approaches the field.

Although but one embodiment of the invention has been illustrated and described in detail, it is to be expressly understood that the invention is not limited thereto. Various changes can be made in the design or arrangement of the parts without departing from the spirit and scope of the invention as the same will now be understood by those skilled in the art.

What is claimed is:

1. In an automatic landing system for aircraft having a receiver thereon for receiving a radiant energy beam transmitted from the ground and for developing an output, means responsive to the output of said receiver for developing a control effect for controlling the flight path of the craft, means responsive to said output for automatically rendering said control effect effective for control of the craft when the output of said receiver exceeds a predetermined minimum, and means for rendering said control effect ineffective to control said craft when the energy output of said receiver persistently remains below a predetermined minimum.

2. In a system for automatically landing an aircraft at a predetermined location by means of radiant energy beams transmitted from the ground to control the course of the craft and to control the glide path of the craft, means for receiving radiant energy from said beams, a computer responsive to the received radiant energy and converting it into signals for controlling the course and glide path of the craft, means for preventing control of the craft by said radiant energy beams until the received radiant energy from the course control beam is above a predetermined minimum and until the signals controlling the course of the craft are below a predetermined maximum, means thereafter providing for controlling the course of the craft by the radiant energy beam in said vertical plane, and means for automatically affecting control of the glide path of the craft by said glide path control beam when said radiant energy received therefrom is above a predetermined minimum.

3. In a system for automatically landing an aircraft at a predetermined location by means of radiant energy beams transmitted from the ground to control the course of the craft and to control the glide path of the craft, means for receiving radiant energy from said beams, a computer responsive to the received radiant energy and converting it into signals for controlling the course and glide path of the craft, means for preventing control of the craft by said radiant energy beams until the received radiant energy from the course control beam is above a predetermined minimum and until the signals controlling the course of the craft are below a predetermined maximum, means thereafter providing for controlling the course of the craft by the radiant energy beam in said vertical plane, and means for automatically affecting control of the glide path of the craft by said glide path control beam when said radiant energy received therefrom is above a predetermined minimum, and means for preventing control of the glide path of the craft by glide path control beam until the signals therefrom are substantially zero.

4. In a system for automatically landing an aircraft at a predetermined location by means of radiant energy beams transmitted from the ground to control the course of the craft and to control the glide path of the craft, means for receiving the radiant energy from said beams, a computer having a first channel for converting the received radiant energy from said course control beam into signals for controlling the course of the craft and having a second channel for converting the received radiant energy from said glide path control beam into signals for controlling the glide path of the craft, means for rendering ineffective the signals from said computer to prevent control of the craft by said radiant energy beams until the radiant energy from said course control beam received by said receiving means is above a predetermined minimum and until the controlling signals from the first channel of said computer are below a predetermined maximum, means thereafter rendering effective the signals from the first channel of said computer and providing for controlling the course of the craft by the radiant energy from said course control beam, and means for automatically affecting control of the glide path of the craft by the radiant energy from the glide path control beam by rendering effective the signals from the second channel of said computer when the radiant energy from the glide path control beam received by said receiving means is above a predetermined minimum and the controlling signals from the second channel of said computer are substantially zero.

5. In a system adapted to cooperate with an automatic pilot for automatically landing an aircraft by radiant energy transmitted from the ground in a localizer beam to control the course of the craft and in a glide path beam to control the glide path of the craft, and a localizer and a glide path receiver on the craft for receiving the radiant energy of the localizer and the glide path beams, respectively; said system comprising a localizer computer connected to said localizer receiver for converting the received radiant energy therefrom into signals for operating the automatic pilot to control the course of the craft, a glide path computer connected to said glide path receiver for converting the received radiant energy therefrom into signals for operating the automatic pilot to control the glide path of the craft, first means responsive to the received radiant energy from the localizer beam for rendering the signals from said localizer computer ineffective on said automatic pilot when the radiant energy from said localizer beam received by said localizer receiver is below a predetermined minimum, second means responsive to the controlling signals from said localizer computer for rendering the signals from said localizer computer ineffective on said automatic pilot when said signals are above a predetermined maximum, whereby when said received radiant energy exceeds a predetermined minimum said responsive means becomes operable for rendering said signals effective on said automatic pilot to control the course of the craft when said signals exceed a predetermined maximum said second means becomes operable for rendering said signals ineffective on said automatic pilot, and means for automatically affecting operation of the automatic pilot by the signals from said glide path computer to control the glide path of the craft when the radiant energy received by the glide path receiver is above a predetermined minimum.

6. In a system adapted to cooperate with an automatic pilot for automatically landing an aircraft by radiant energy transmitted from the ground in a localizer beam to control the course of the craft and in a glide path beam to control the glide path of the craft, and a localizer receiver a glide path receiver for receiving the radiant energy of the localizer beam and the glide path beam, said system comprising a localizer computer connected to said localizer receiver for converting the received radiant energy therefrom into signals for operating the automatic pilot to control the course of the craft, a glide path computer connected to said glide path receiver for converting the received radiant energy therefrom into signals for operating the automatic pilot to control the glide path of the craft, means responsive to the received radiant energy from the localizer beam and rendering ineffective the signals from said localizer computer on said automatic pilot when the radiant energy from said localizer beam received by said localizer receiver is below a predetermined minimum, means responsive to the controlling signals from said localizer computer and rendering ineffective the signals from said localizer computer on said automatic pilot when said signals are above a predetermined maximum, whereby said first-mentioned responsive means becomes operative when said receiver energy exceeds a predetermined minimum for rendering said signals effective on said automatic pilot to control the course of the craft, and means for automatically affecting operation of the automatic pilot by the signals from said glide path computer to control the glide path of the craft when the radiant energy received by the glide path receiver is above a predetermined minimum, and means for preventing control of the automatic pilot by the signals from said glide path computer until the signals therefrom are substantially zero.

7. In a system for automatically landing an aircraft at a predetermined location by means of a radiant energy beam transmitted from the ground for controlling the glide path of the craft, a receiver for receiving radiant energy from the beam, means responsive to the output of the receiver for controlling the glide path of the craft, and means automatically rendering effective control of the craft by said responsive means when the radiant energy received by said receiver is above a predetermined minimum and for rendering ineffective control of the craft by said responsive means when the radiant energy received by said receiver is below a predetermined minimum, said means including a time delay circuit for maintaining control of the craft by said responsive means when the radiant energy received by said receiver falls below the predetermined minimum for short periods.

8. In a system for automatically landing an aircraft at a predetermined location by means of radiant energy beams transmitted from the ground to provide a descending flight path for said aircraft in a predetermined direction toward said location, means for receiving radiant energy from said beams, means for preventing control of the craft by said radiant energy beams until the received radiant energy from one of said beams is above a predetermined minimum and thereafter providing for controlling the craft thereby, and means for automatically affecting control of the craft by said other radiant energy beam when the received radiant energy therefrom is above a predetermined minimum, said two last mentioned means including time delay circuits for maintaining control of the craft by said radiant energy beams when the received radiant energy therefrom falls below the predetermined minimum for short periods.

References Cited in the file of this patent

UNITED STATES PATENTS

| | | |
|---|---|---|
| 2,393,624 | Ferrill | Jan. 29, 1946 |
| 2,429,595 | Abraham | Oct. 28, 1947 |
| 2,489,248 | Abraham | Nov. 29, 1949 |
| 2,524,746 | Anast | Oct. 10, 1950 |
| 2,575,890 | Perkins et al. | Nov. 20, 1951 |